United States Patent [19]

Albright

[11] Patent Number: 5,622,399
[45] Date of Patent: Apr. 22, 1997

[54] REMOTE TIE-OFF ADAPTOR AND SNAP HOOK ATTACHMENT DEVICE

[75] Inventor: James R. Albright, Lake City, Minn.

[73] Assignee: D B Industries, Inc., Red Wing, Minn.

[21] Appl. No.: 543,296

[22] Filed: Oct. 16, 1995

[51] Int. Cl.⁶ .................................................... B25J 1/00
[52] U.S. Cl. ............................................. 294/24; 294/19.1
[58] Field of Search ............................ 294/19.1, 22–24, 294/85; 114/221 R, 230; 248/317, 339, 340, 343, 544

[56] References Cited

U.S. PATENT DOCUMENTS

| | | | |
|---|---|---|---|
| 2,979,013 | 4/1961 | Whittall | 294/19.1 |
| 3,072,429 | 1/1963 | Stipan | 294/19.1 |
| 3,098,462 | 7/1963 | Holzman | 294/19.1 |
| 3,273,928 | 9/1966 | Wisniewski | 294/19.1 X |
| 3,327,376 | 6/1967 | Freeman et al. | 294/19.1 X |
| 3,913,515 | 10/1975 | Hernsjö et al. | 294/19.1 |
| 4,163,576 | 8/1979 | Hoop | 294/19.1 |
| 4,518,184 | 5/1985 | Pecorini | 294/19.1 |
| 4,595,223 | 6/1986 | Hawie | 294/19.1 |
| 4,751,892 | 6/1988 | Sechel et al. | 114/221 R |
| 4,793,646 | 12/1988 | Michaud, Jr. | 294/19.1 |
| 4,895,407 | 1/1990 | Mozer | 294/19.1 |
| 4,932,700 | 6/1990 | Hart | 294/19.1 |
| 4,986,207 | 1/1991 | Reed | 114/221 R |
| 5,190,330 | 3/1993 | Dunham | 294/19.1 |
| 5,190,331 | 3/1993 | Corbin | 294/24 |
| 5,215,344 | 6/1993 | Augustyniak | 294/19.1 |
| 5,292,160 | 3/1994 | Deichman | 294/19.1 |
| 5,415,446 | 5/1995 | Olsen et al. | 294/19.1 |

*Primary Examiner*—Johnny D. Cherry
*Attorney, Agent, or Firm*—Moore & Hansen

[57] ABSTRACT

An apparatus for securing a tie-off adaptor to a remote anchoring position, and for engaging and disengaging a snap hook and accompanying lifeline to the tie-off adaptor. The tie-off adaptor includes a web strap with a large D-ring attached on one end and a smaller D-ring attached on the other end. The tie-off adaptor positioning assembly includes a strap arm with a notched end for positioning the tie-off adaptor. The strap arm attaches to a mounting block that is removably attachable to the extendable pole. Also attached to the mounting block is a hook used to pull the smaller D-ring of the tie-off adaptor through the larger D-ring thereof. The hook is also used for removing the tie-off adaptor from the tie-off member after it has been used by engaging the larger D-ring and pulling it over the smaller D-ring to free the adaptor. A snap hook attachment assembly, interchangeable with the tie-off adaptor positioning assembly, permits remote engagement and disengagement of a snap hook to the tie-off adaptor.

13 Claims, 7 Drawing Sheets

REMOTE TIE-OFF ADAPTOR AND SNAP HOOK ATTACHMENT DEVICE

BACKGROUND OF THE INVENTION

1. Technical Field

The present invention relates generally to a device for remotely positioning a safety device, and in particular to a device for remotely attaching a tie-off adaptor and a snap hook.

2. Background Information

The ultimate objective of all those concerned with the safety of workers who do their jobs at great heights above the ground is to prevent accidents and deaths of these workers from falling. One way of accomplishing this goal is always to have all workers attached as by a safety line to a fixed object, so that the safety line will stop an accidental fall before the worker reaches the ground. Ideally, regardless of where the worker is positioned, the worker will be attached to at least one rigid object, or anchor. This is known as "100% tie-off." In reality, however, there are many situations where the first worker to climb to a remote workstation must reach that spot without the benefit of a safety line. The risk to this worker may not be great, but in some situations, the risk may be very great indeed.

A tie-off adaptor is a common device used as an attachment point for a safety line. Tie-off adaptors generally range in length from three feet to six feet and are normally installed by wrapping them around some solid horizontal structural member such as an I-beam, which is referred to as the tie-off member or anchor. A snap hook is commonly attached to a ring on the tie-off adaptor, the snap hook having a safety line attached thereto. Snap hooks, however, usually have multiple actuation points to prevent inadvertent opening of the hook. This safety feature has rendered difficult the task of remote placement of snap hooks using mechanical devices.

Devices are known for remotely placing rope or cord over a remote object. Furthermore, devices are known for remotely engaging and disengaging non-locking carbine hooks, especially for marine applications. However, marine carbine hooks are relatively easy to actuate, since they do not generally afford the safety features of a snap hook. Also, combining the features of remote line placement and remote engagement and disengagement of a snap hook into a single, reliable, easily operated device has proven to be a difficult challenge.

The remote tie-off adaptor and snap hook attachment device of the present invention overcomes difficulties described above and affords other features and advantages heretofore not available.

SUMMARY OF THE INVENTION

The remote tie-off adaptor and snap hook attachment device of the present invention includes an extendable pole to which a tie-off adaptor positioning assembly and a snap hook attachment assembly may be interchangeably and releasably engaged. The tie-off adaptor includes a web strap with a large D-ring attached on one end and a smaller D-ring attached on the other end. The tie-off adaptor positioning assembly includes a strap arm with a notched end for positioning the tie-off adaptor. The strap arm attaches to a mounting block that is removably attachable to the extendable pole. Also attached to the mounting block is a hook used to pull the smaller D-ring of the tie-off adaptor through the larger D-ring thereof. The hook is also used for removing the tie-off adaptor from the tie-off member after it has been used by engaging the larger D-ring and pulling it over the smaller D-ring to free the adaptor. A snap hook attachment assembly, interchangeable with the tie-off adaptor positioning assembly, permits remote engagement and disengagement of a snap hook to the tie-off adaptor.

The tie-off adaptor is held in position on the tie-off adaptor positioning assembly by means of a strap rod that releasably secures the tie-off adaptor against the mounting block. A rope attached to a lever arm rotates the strap rod out of its strap securing position on the pivot shaft.

It is an object of this invention to provide a safety device that will easily and effectively position a tie-off adaptor in position on a tie-off member for attachment of a safety lifeline. It is a further object of this invention to provide a device for attachment of a snap hook having a safety lifeline attached thereto to the tie-off adaptor. It is yet a further object of this invention to provide a device for removal of a snap hook from a tie-off adaptor. It is also a further object of this invention to provide a device for removal of the tie-off adaptor from the tie-off member.

Other objects and advantages of the invention will become apparent from the following detailed description and from the appended drawings in which like numbers have been used to describe like parts throughout the several views.

DESCRIPTION OF THE PREFERRED EMBODIMENT

Figure 1:
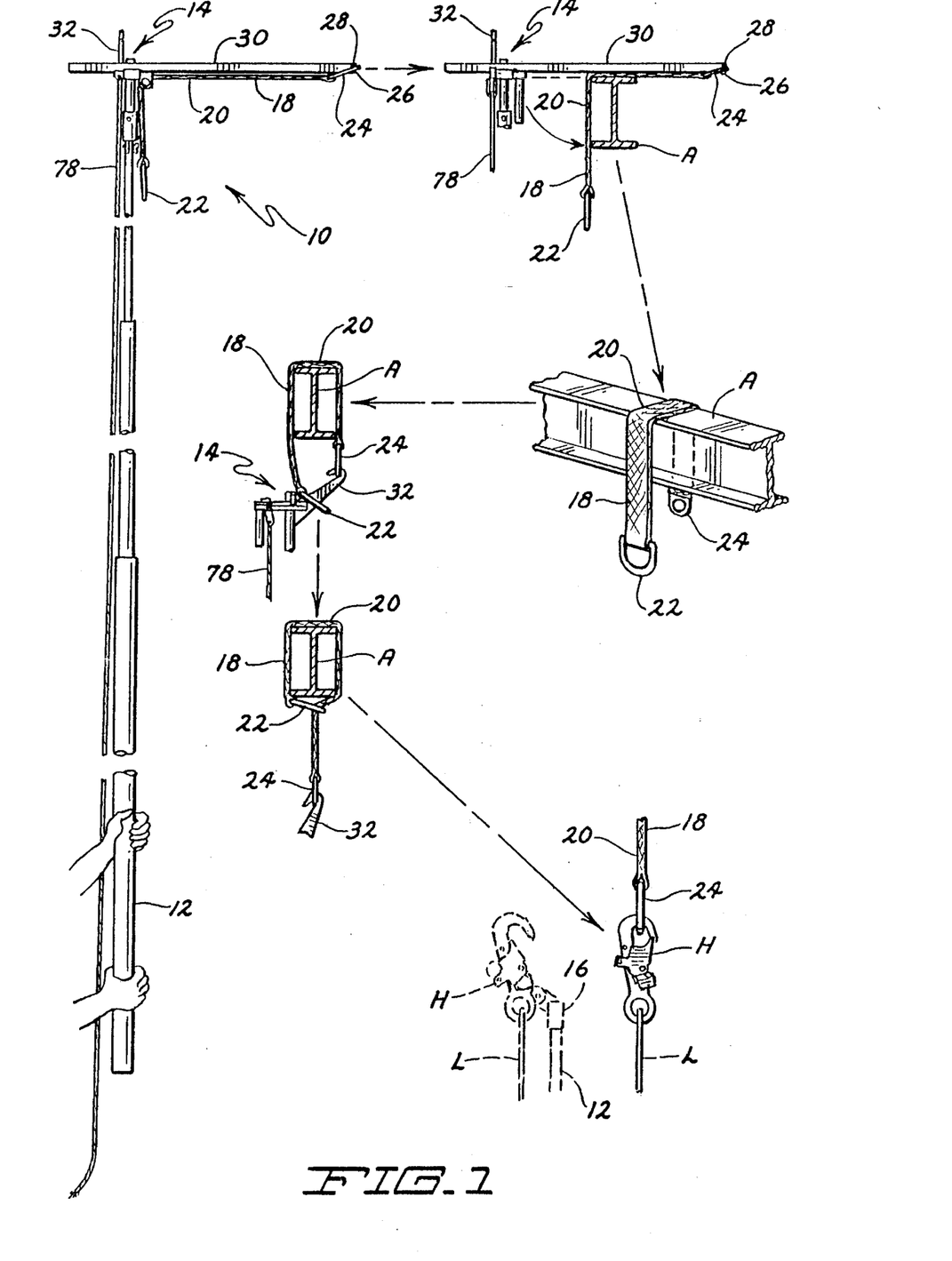
FIG. 1 shows the steps followed in attaching a tie-off adaptor and a snap hook to an anchor using the remote tie-off adaptor and snap hook attachment device of the present invention.
Figure 2:
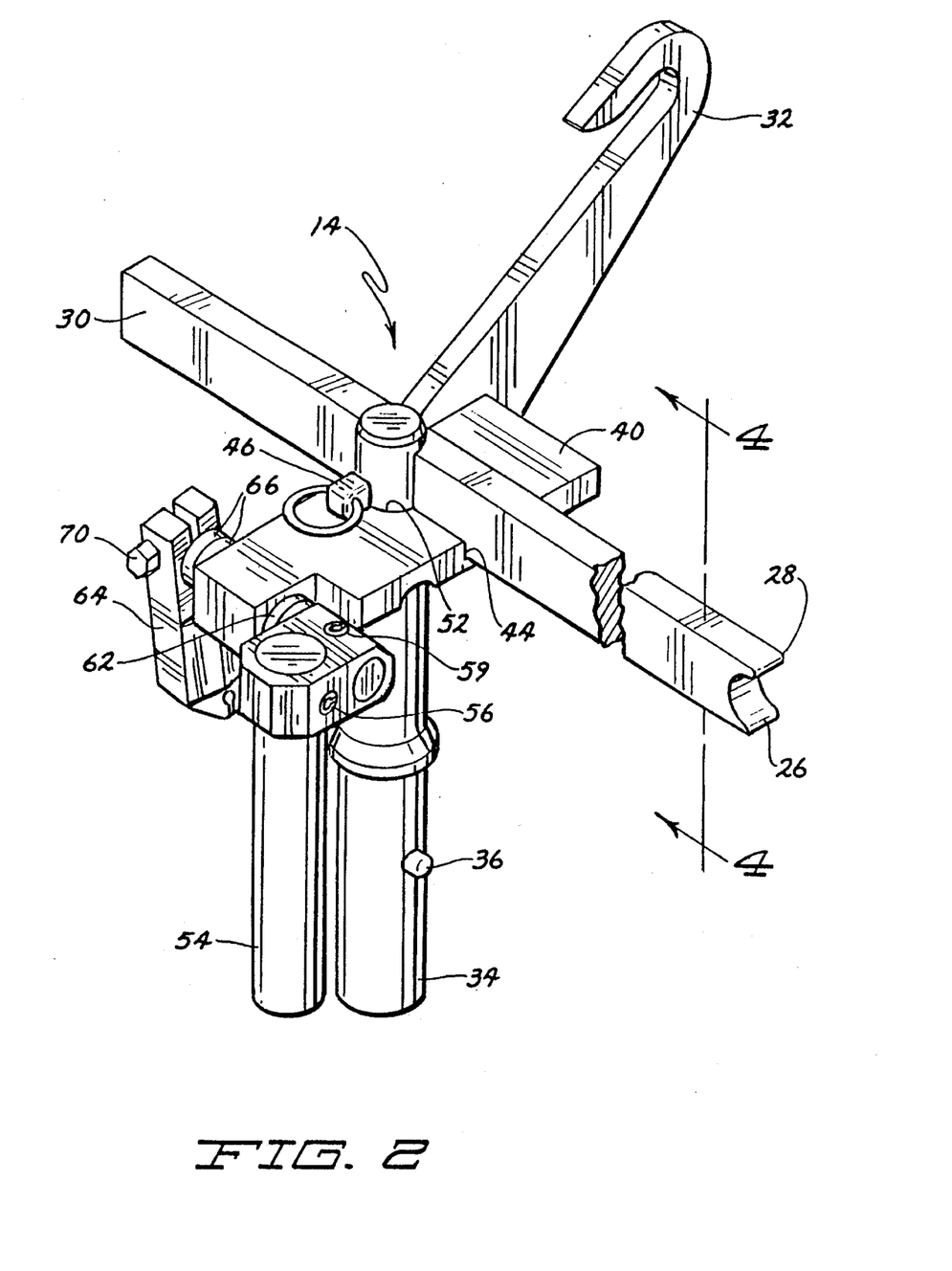
FIG. 2 is a perspective view of the present invention showing the remote tie-off adaptor positioning assembly.
Figure 3:
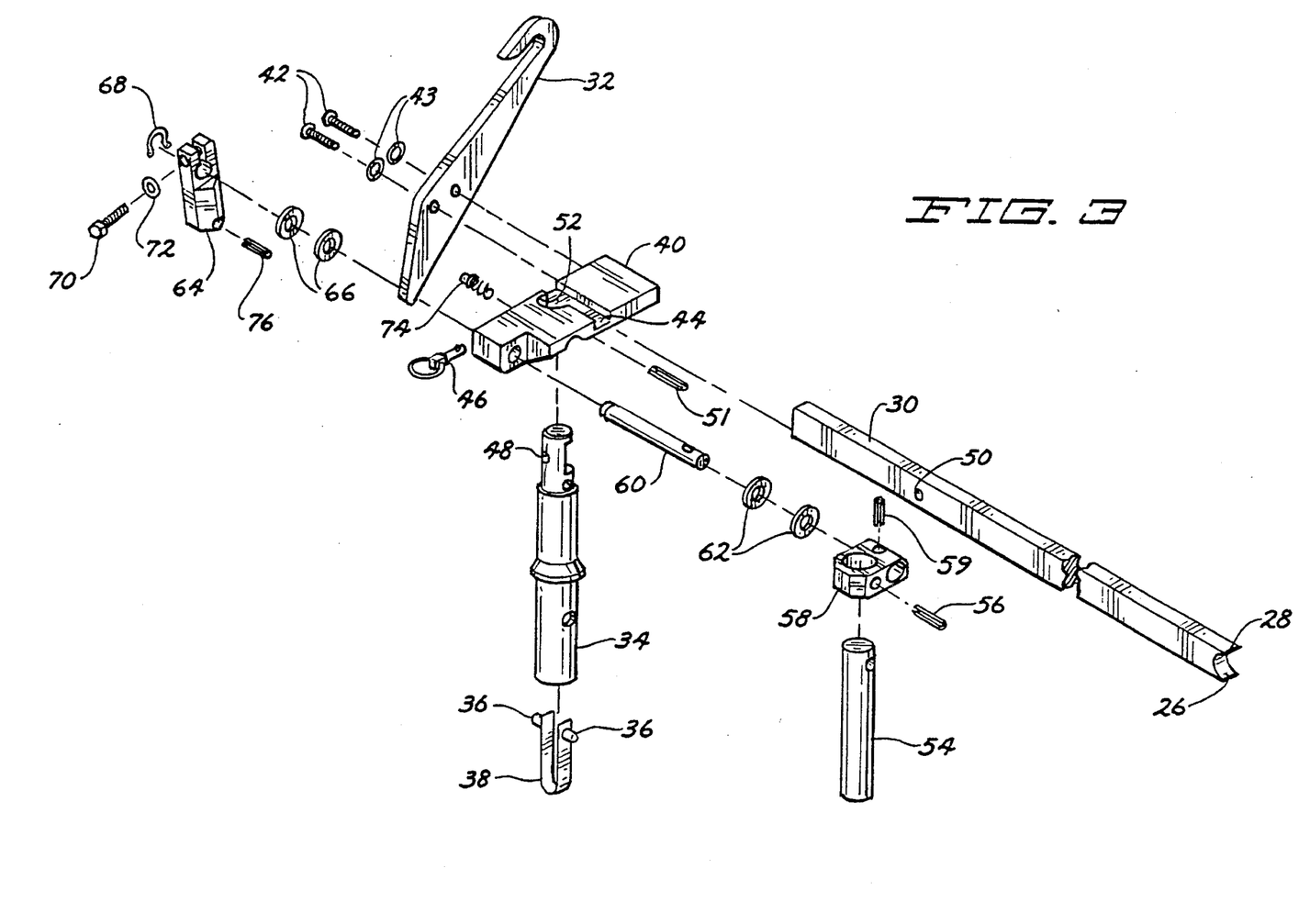
FIG. 3 is an exploded view of the remote tie-off adaptor positioning assembly shown in FIG. 2.
Figure 4:
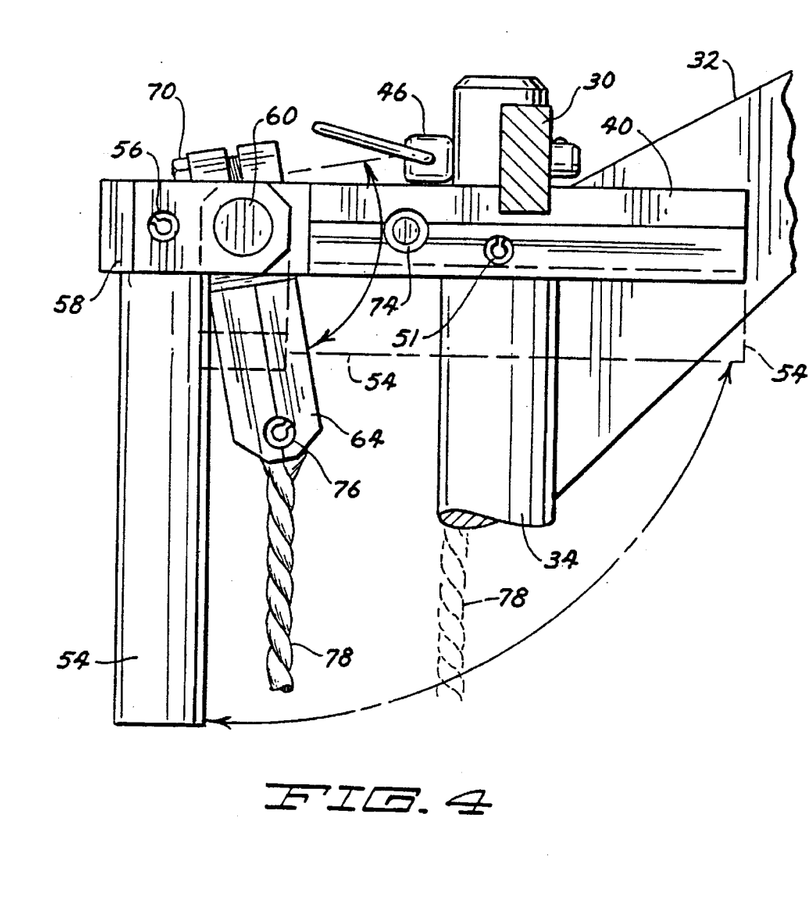
FIG. 4 is a partial section right side view of the remote tie-off installation assembly taken along line 4—4 of FIG. 2.

With reference to the drawings, and in particular to FIG. 1, the remote tie-off adaptor and snap hook attachment device is generally indicated by reference numeral 10. The remote attachment device includes an extension pole 12, to which may be releasably attached a tie-off adaptor positioning assembly 14 and a snap hook attachment assembly 16.

As shown in FIG. 1, tie-off adaptor positioning assembly 14 is attached to the end of extension pole 12 for positioning a tie-off adaptor 18 over a horizontal anchor or tie-off member such as I-beam A. Tie-off adaptor 18 includes a web strap 20 having a first D-ring 22 and a second D-ring 24 attached to the two ends thereof. First D-ring 22 is sufficiently large enough to permit second D-ring 24 easily to pass therethrough. When positioning tie-off adaptor 18 on an anchor A, second D-ring 24 is first positioned to engage the V-groove 26 of the notched end 28 of strap arm 30. Web strap 20 is then pulled tight along the bottom of strap arm 30 toward extension pole 12 to secure second D-ring 24 in V-groove 26. With tie-off adaptor 18 secured, as shall be explained, to tie-off adaptor positioning assembly 14, strap arm 30 is positioned above anchor A and tie-off adaptor 18 is released to straddle anchor A.

A hook member 32, integral with tie-off positioning assembly 14, is then used to draw second D-ring 24 through first D-ring 22, and then tighten web strap 20 of tie-off adaptor 18 around anchor A. Tie-off positioning assembly 14 is then replaced on extension pole 12 with snap hook attachment assembly 16. A snap hook H, as disclosed in U.S. Pat. No. 4,977,647, the contents of which are incorporated herein by reference, may then be attached to second D-ring 24 using snap hook attachment assembly 16. Preferably, a lifeline L would be attached to and suspended from snap hook H.

Referring to FIGS. 2–5, tie-off adaptor positioning assembly 14 is shown ready for mounting to extension pole 12. As may be seen in FIGS. 2 and 3, support shaft 34 includes two opposing holes having the buttons 36 of snap member 38 projecting therefrom. These buttons 36 engage extension pole 12 for attachment thereto. The upper end of support shaft 34 engages mount block 40. Hook member 32 is fixedly attached as by screws 42 and lock washers 43 to mount block 40. Strap arm 30 rests in groove 44 of mount block 40, and releasably engages support shaft 34 with spring plunger 46, which engages holes 48 of support shaft 34 and 50 of strap arm 30. As may be seen, the upper end of support shaft 34 passes through a hole in mount block 40, including an inset portion 52 adjacent groove 44. Support shaft 34 fixedly engages mount block 40 with spring pin 51.

Figure 5:
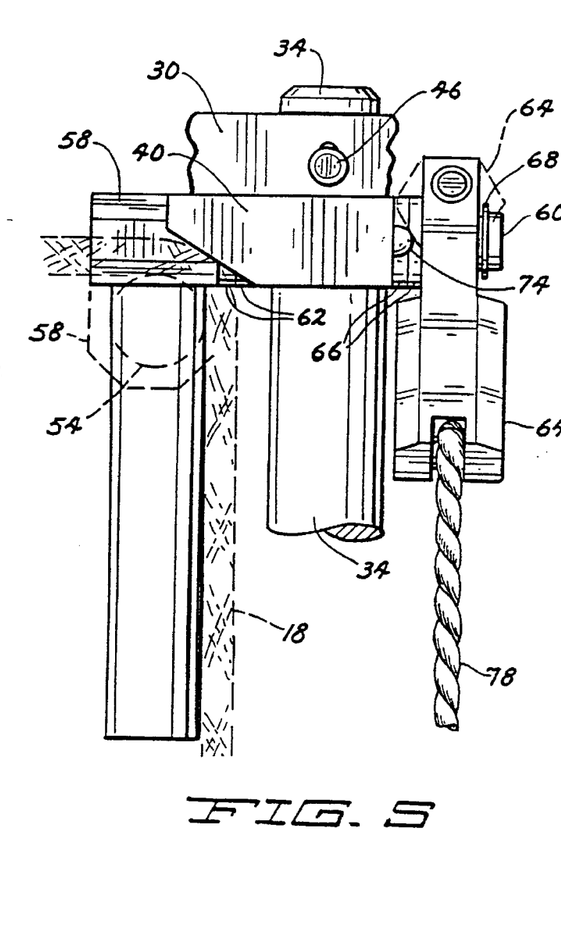
FIG. 5 is a partial cutaway front end view of the remote tie-off installation assembly shown in FIG. 2.
Figure 6:
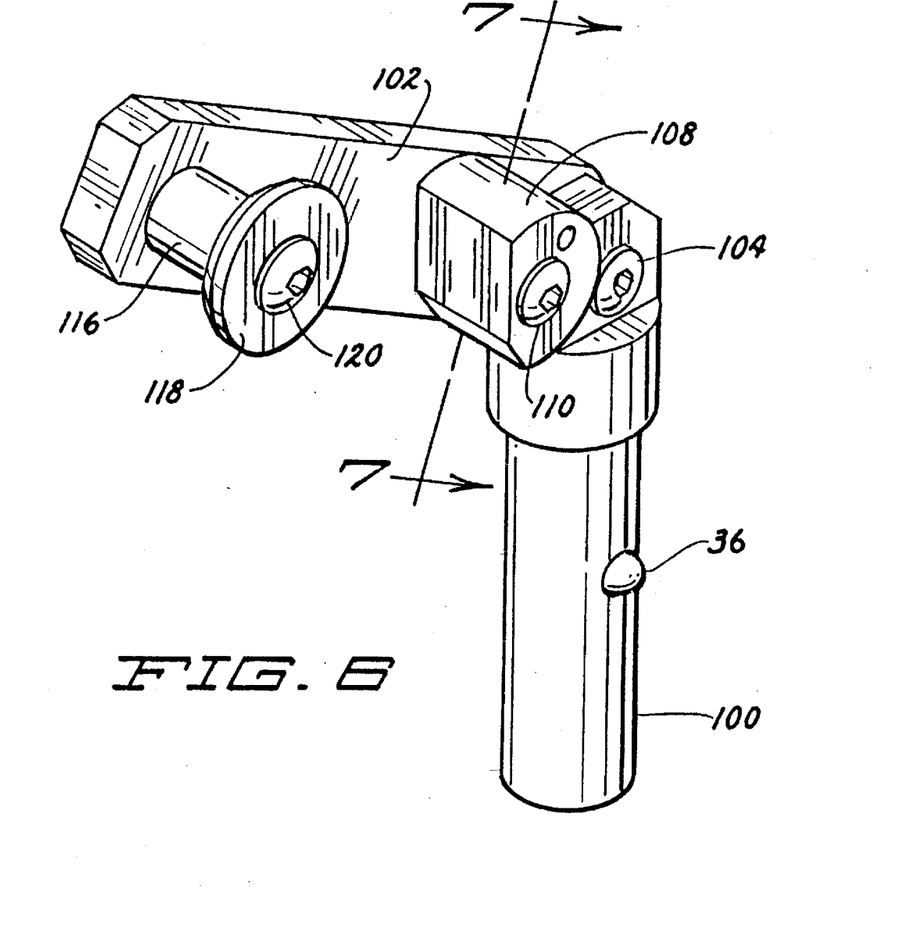
FIG. 6 is a perspective view of the snap hook attachment device of the present invention.

Rotatably attached to mount block 40 is strap rod 54, which supports tie-off adaptor 18 while it is being positioned over anchor A. Strap rod 54 is fixedly attached as by spring pin 56 to pivot block 58. In turn, pivot block 58 is mounted to pivot shaft 60, as by spring pin 59, with shims 62 maintaining a rotating interval between pivot block 58 and mount block 40. Pivot shaft 60 rotatably engages mount block 40, and is fixedly attached on its opposite end to lever arm 64. Lever arm 64 is also spaced from mount block 40 with shims 66. Pivot shaft 60 engages lever arm 64 with the help of retaining ring 68, screw 70 and lock washer 72. As best shown in FIG. 5, when strap rod 54 is raised to hold the tie-off adaptor 18, which in turn raises lever arm 64, spring plunger 74 is engaged by lever arm 64, causing strap rod 54 to remain in the raised position. Attached to lever arm 64, preferably as by spring pin 76, is a rope 78, shown in FIGS. 4 and 5. Once tie-off adaptor 18 is positioned over anchor A, rope 78 is pulled down, allowing lever arm 64 to overcome the force of spring plunger 74.

Figure 7:
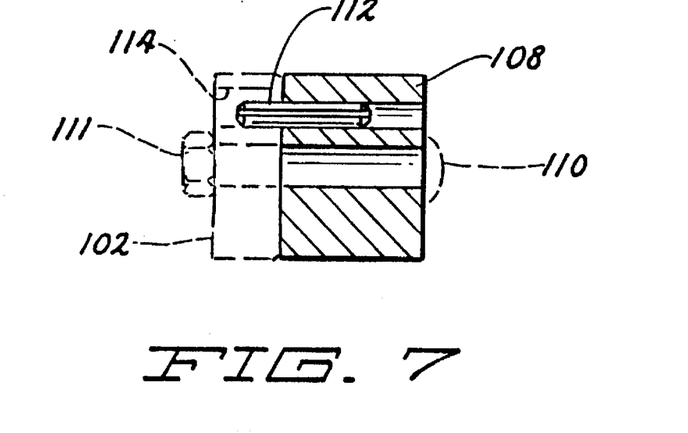
FIG. 7 is a section view of the pivoting member of the snap hook attachment device taken along line 7—7 of FIG. 6.
Figure 8:
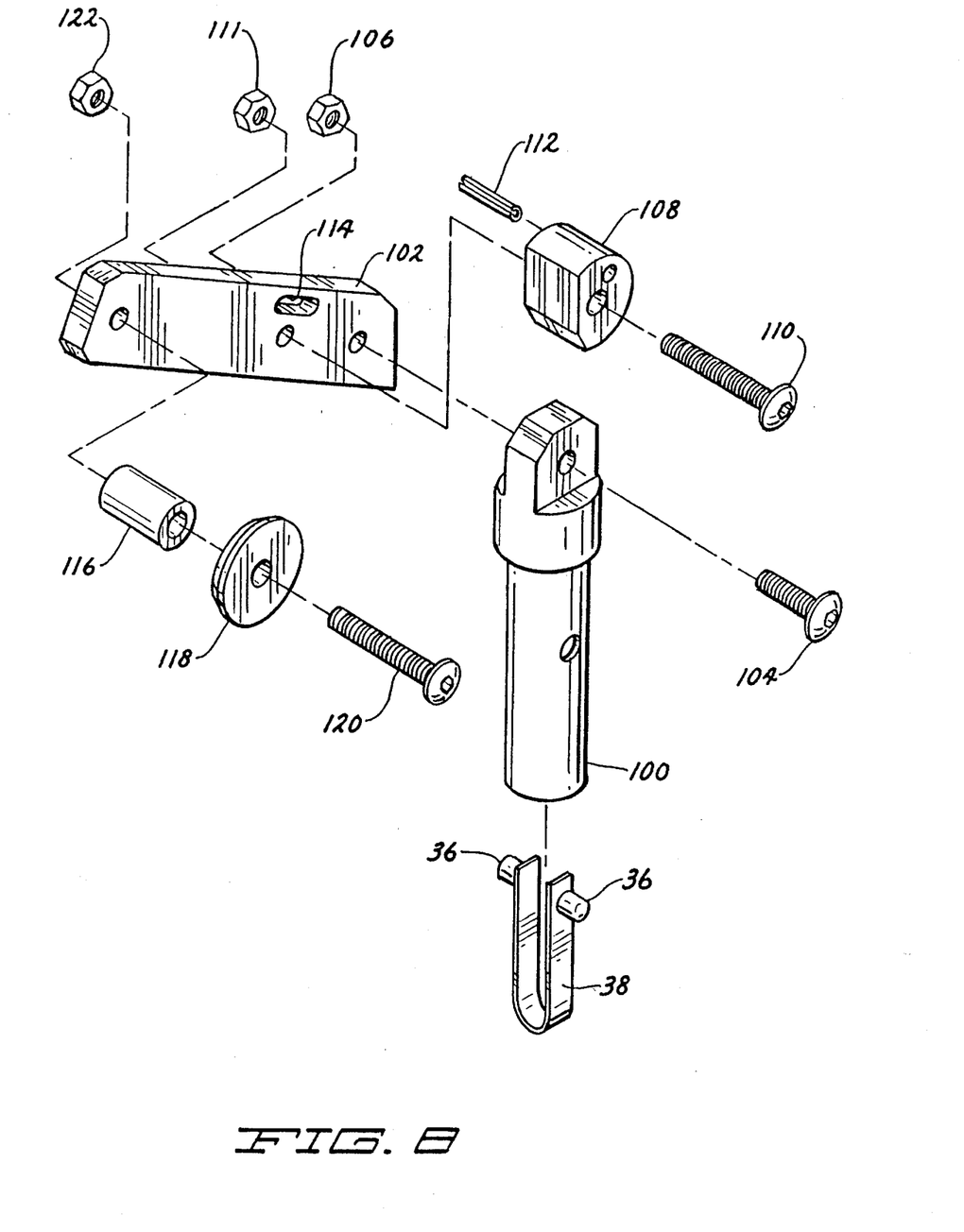
FIG. 8 is an exploded view of the snap hook attachment device shown in FIG. 6.

Referring to FIGS. 6–10, snap hook attachment assembly 16 is shown ready for mounting to extension pole 12. As may be seen in FIGS. 6 and 8, adapter 100 includes two opposing holes having buttons 36 of snap member 38 projecting therefrom. These buttons 36 engage extension pole 12 for attachment thereto. The upper end of adapter 100 engages lever arm 102 as by screw 104 and nut 106. Pivotally engaged to lever arm 102 is cam 108, which pivots about screw 110, secured by nut 111. The range of motion of cam 108 is limited by spring pin 112, which projects therefrom as shown in FIG. 7. Spring pin 112 then engages slot 114 in lever arm 102. Rotatably attached to lever arm 102 are roller 116 and roller washer 118, secured to lever arm 102 by screw 120 and nut 122.

Figure 9:
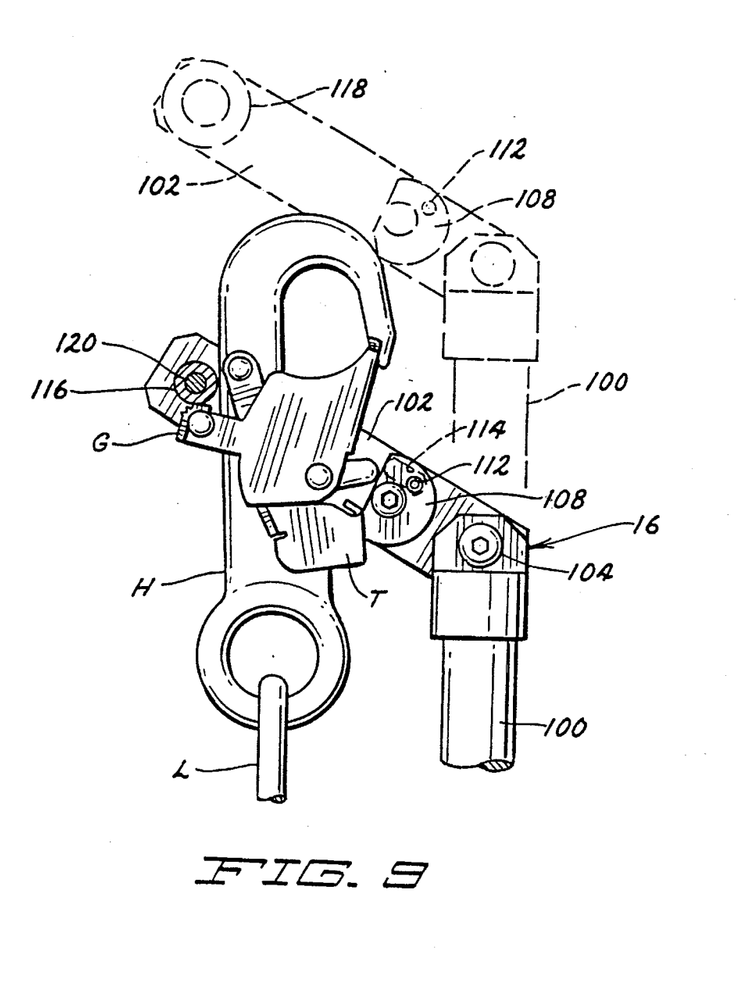
FIG. 9 is a partially cut away front view of the snap hook attachment device shown engaging a snap hook.
Figure 10:
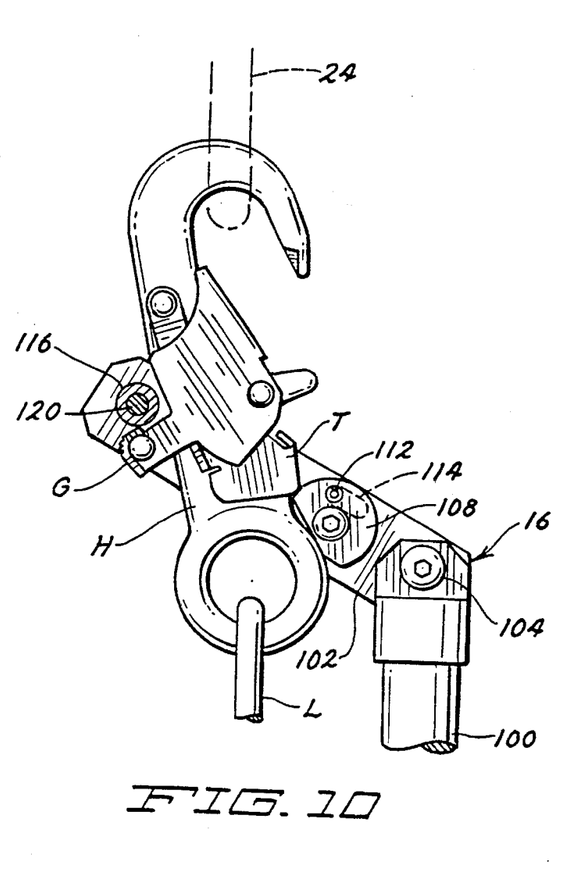
FIG. 10 is a partially cut away front view of the snap hook attachment device shown in FIG. 9 after the snap hook has been positioned on a D-ring of the tie-off adaptor.

In use, as shown in FIGS. 9 and 10, beveled washer 118 allows roller 116 to be more easily targeted for engagement with the gate lever G of snap hook H. Cam 108 engages gate latch T of snap hook H, as shown in FIG. 9, and pivots to the position shown in FIG. 10 as extension pole 12, attached to adapter 100, is pulled downward. To disengage snap hook H from snap hook attachment assembly 16 after snap hook H is attached to second D-ring 24, lifeline L is pulled right and parallel with the extension pole 12 while the pole is rotated to release cam 108 from its position in locking engagement under latch T.

While the preferred embodiments of the invention have been described, it should be understood that various changes, adaptations and modifications may be made therein without departing from the spirit of the invention and the scope of the appended claims.

What is claimed is:

1. A remote tie-off adaptor positioner and snap hook attachment device for attaching and detaching a snap hook to and from the remote tie-off adaptor, the tie-off adaptor having a first loop and a second loop connected by a sturdy, flexible segment, and the snap hook having a gate lever and a gate latch, the device comprising:

a detachable, extensible pole member having a distal end;

a tie-off adaptor positioning assembly releasably engageable with said distal end of said extensible pole member for positioning a tie-off adaptor in a remote location;

a strap arm on said tie-off adaptor positioning assembly for positioning the tie-off adaptor;

a strap rod pivotally attached to said tie-off adaptor positioning assembly for supporting the tie-off adaptor while it is being positioned by said strap arm of said tie-off adaptor positioning assembly;

a snap hook attachment assembly releasably engageable with said distal end of said extensible pole member for engaging a snap hook to and disengaging a snap hook from a remote location; and remote operating means for remotely operating said tie-off adaptor positioning assembly.

2. The remote tie-off adaptor positioner and snap hook attachment device described in claim 1, wherein said tie-off adaptor positioning assembly further comprises:

a mount block for retaining said strap arm in a fixed position; and a pivot block rotatably attached to said mount block, said strap rod being fixedly attached to said pivot block.

3. The remote tie-off adaptor positioner and snap hook attachment device described in claim 1, further comprising:

a hook member on said tie-off adaptor positioning assembly for engaging a loop of the remote tie-off adaptor during positioning of the tie-off adaptor in a remote location.

4. The remote tie-off adaptor positioner and snap hook attachment device described in claim 3, further comprising:

a mount block for retaining said strap arm and said hook member in a fixed position; and a pivot block rotatably attached to said mount block, said strap rod being fixedly attached to said pivot block.

5. The remote tie-off adaptor positioner and snap hook attachment device described in claim 1, wherein said snap hook attachment assembly further comprises:

an adapter releasably engageable with said distal end of said extensible pole member;

a support member fixedly attached to and projecting from said adapter, said support member having a mounting surface on a side thereof; and first and second snap hook engaging members attached to said mounting surface of said support member, whereby said first snap hook engaging member engages the gate lever of the snap hook and said second snap hook engaging member engages the gate latch of the snap hook.

6. The remote tie-off adaptor positioner and snap hook attachment device described in claim 5, wherein:

said first and second snap hook engaging members are a fixed distance apart.

7. The remote tie-off adaptor positioner and snap hook attachment device described in claim 5, wherein said second snap hook engaging member further comprises:

a cam member pivotally attached to said mounting surface of said support member.

8. The remote tie-off adaptor positioner and snap hook attachment device described in claim 7, wherein said second snap hook engaging member further comprises:

a groove formed through said support member; and a pin member projecting from said cam member past said mounting surface, said pin member engaging said groove, whereby said groove limits the rotation of said cam member relative to said support member.

9. The remote tie-off adaptor positioner and snap hook attachment device described in claim 7, wherein said first snap hook engaging member further comprises:

a projecting member projecting from said mounting surface of said support member, said projecting member having a proximal end and a distal end, said proximal end being adjacent to said mounting surface of said support member; and retaining means rotatably attached to said distal end of said projecting member for retaining the snap hook on said snap hook attachment assembly.

10. A snap hook attachment device for attaching and detaching a snap hook to and from a remote location, the snap hook attachment device being attachable to an extensible pole, the snap hook having a gate lever and a gate latch, the device comprising:

an adapter engageable with the extensible pole;

a support member fixedly attached to and projecting from said adapter, said support member having a mounting surface on a side thereof; and first and second snap hook engaging members attached to said mounting surface of said support member, said first and second snap hook engaging members being a fixed distance apart, said second snap hook engaging member comprising a cam member pivotally attached to said mounting surface of said support member, whereby said first snap hook engaging member engages the gate lever of the snap hook and said cam member engages the gate latch of the snap hook.

11. The snap hook attachment device described in claim 10, wherein said second snap hook engaging member further comprises:

a groove formed through said support member; and a pin member projecting from said cam member past said mounting surface, said pin member engaging said groove, whereby said groove limits the rotation of said cam member relative to said support member.

12. The snap hook attachment device described in claim 10, wherein said first snap hook engaging member further comprises:

a projecting member projecting from said mounting surface of said support member, said projecting member having a proximal end and a distal end, said proximal end being adjacent to said mounting surface of said support member; and retaining means rotatably attached to said distal end of said projecting member for retaining the snap hook on said snap hook attachment assembly.

13. The snap hook attachment device described in claim 10, wherein:

said cam member has a receiving position for engaging the snap hook and a locking position, whereby said cam member pivots to said locking position for maintaining the gate latch of the snap hook in an open position.

* * * * *

UNITED STATES PATENT AND TRADEMARK OFFICE
CERTIFICATE OF CORRECTION

PATENT NO. : 5,622,399
DATED : April 22, 1997
INVENTOR(S) : Albright

It is certified that error appears in the above-identified patent and that said Letters Patent is hereby corrected as shown below:

Column 4, Line 16 please delete "right" and insert --tight--.

Signed and Sealed this

Twenty-third Day of June, 1998

Attest:

BRUCE LEHMAN

*Attesting Officer*           *Commissioner of Patents and Trademarks*